3,395,053
THERMAL CONTROL COATING
Noel T. Wakelyn, Hampton, Va., assignor to the United States of America as represented by the Administrator of the National Aeronautics and Space Administration
Filed Nov. 17, 1964, Ser. No. 411,945
4 Claims. (Cl. 148—6.16)

ABSTRACT OF THE DISCLOSURE

A method of improving the optical and thermal control property characteristics of an aluminum surface having a metal phosphate protective coating thereon comprising subjecting the surface coating to a controlled temperature low concentration alkaline solution for a controlled period of time to improve the chemical bond of the coating with the substrate and to reduce the coating weight.

---

Figure 1:
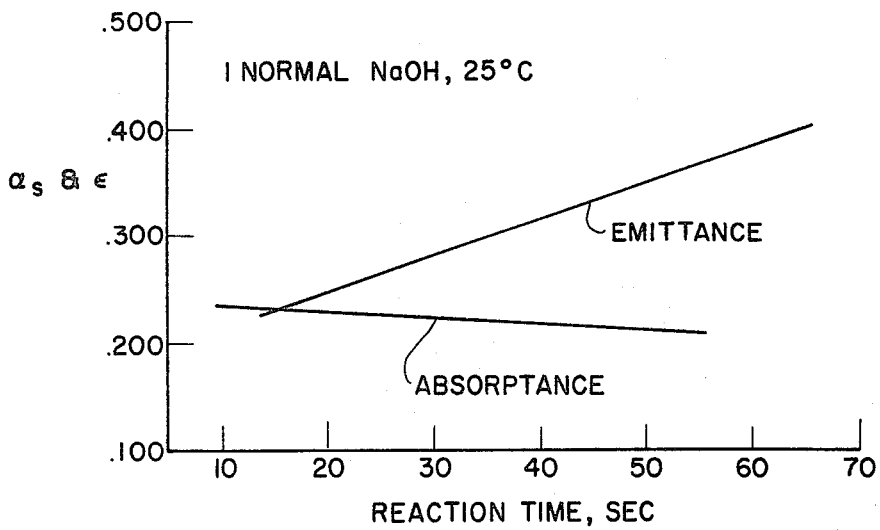

The invention described herein may be manufactured and used by or for the Government of the United States of America for governmental purposes without the payment of any royalties thereon or therefor.

This invention relates generally to the thermal control of space vehicles, and relates with particularity to a specific coating having a minimum density and maximum cooling capability for an aluminum surface for use as the external surface area of lightweight inflatable space vehicles to passively control temperature of the vehicles when exposed to a spatial environment.

The most significant parameter that can be varied to control the temperature of satellites and space vehicles is the ratio of the solar absorptance to the low temperature emittance $a_s/e$ of the external vehicle surface area. The expression $a_s/e$ is the ratio of the absorptivity of the face of a plate to solar radiation $a_s$ to the emissivity of the face of the plate to solar radiation $e$. Since these quantities are dependent only on the unit surface of an object, the temperature of the object can be adjusted to the desired value by selecting a coating for the object surface or face that has the requisite value of $a_s/e$. This is the routine procedure used in the design of thermally controlled spacecraft.

Previous passive methods of controlling the surface temperature of space vehicles have included surface oxidation vapor deposition of thin metallic films onto the surface, and partially coating the surface area of the spacecraft with paint to attain the desired effective thermal radiation characteristics. The disadvantages of these prior art surface treatments involve the numerous problems in maintaining the required delicate environment for adequate application thereof which makes the applications not only hard to control, but limiting in practicality to small surface areas. The disadvantages of paints is that most of those presently available do not possess stable thermal radiation characteristics when exposed to the space environment and no known method of application of the paints has been achieved to produce the desired thermal radiation characteristics while minimizing the weight thereof. Further, no known method of paint application has been developed capable of obtaining a wide range of thermal radiation characteristics or for providing a complete coverage of the surface area to minimize thermal gradients.

Due to the limited capabilities of present day booster rockets, coating materials employed to achieve thermal balance in a spacecraft or satellite structure must be kept at a minimum for maximum utilization of the chargeable payload weight.

A recent innovation in controlling $a_s/e$ that has proved highly successful in thermal control of the now famous Echo-type lightweight inflatable satellite structures is disclosed in the copending application Ser. No. 277,961, filed May 3, 1963, by Dewey L. Clemmons, Jr., now U.S. Patent No. 3,176,933 and of common assignment as the present application. As disclosed in this patent, these lightweight spherical passive communication satellites are of laminate panel construction with the laminate being composed of a 0.00035-inch thick Mylar film adhesively bonded between two layers of 0.00018-inch thick 1080 aluminum foil. The aluminum foil has a low temperature, 0° to 100° C., emittance of 0.03 and an absorptance to solar radiation of 0.18, giving an $a_s/e$ ratio of 6.0. Calculations indicated that if the aluminum surface characteristics could be altered such that an $a_s/e$ ratio essentially equal to 1.67 could be maintained, the desired average temperature of 45°–73° C. of the aluminized sphere would be maintained throughout the orbital flight of this particular satellite vehicle. Control within this particular temperature range was essential for optimum operation of the associated telemetry beacons on the vehicle. By selecting a temperature control coating having an $a_s/e$ ratio of 1.67, or a coating with an $a_s/e$ ratio of less than 1.67 and applying this coating on the aluminum foil of such density that the resulting $a_s/e$ ratio would be 1.67, this desired temperature range can be obtained.

The copending application discloses a unique process for chemically coating the aluminum foil exterior surfaces with an amorphous metallic phosphate coating wherein the coating surface density controls the surface $a_s/e$ ratio to that desired. The chemical solution employed to produce this chemically adherent coating on the aluminum surface was an aqueous solution of chromic, phosphoric and hydrofluoric acids with the $a_s/e$ ratio obtained being dependent upon the concentration of the various acids, the laminate immersion time in the acid solution, and the temperature of the acid bath, as set forth in the referenced copending application. This coating process is referred to in one commercial application as "Alodizing" and the solutions used for the chemical conversion of the aluminum surface are available under the trade name Alodine from the AmChem Products Company.

Alodine is available in essentially any desired ratio of acid mixtures and the mixture employed in the copending application was such that the resulting coating contained essentially 50–55 percent chromium phosphate $CrPO_4$, 17–23 percent aluminum phosphate $AlPO_4$, 22–23 percent water, as well as traces of the fluorides of aluminum, chromium, and calcium, with the water being wholly or partially removable by heat. This coating has the chemical property characteristic of being insoluble in water, alcohols, dilute acids and dilute alkalies, while being soluble in molten sodium nitrate and concentrated nitric acid solutions. A more complete analysis of Alodine and its property characteristics appear in the 36th Annual Proceedings of the American Electro-platers Society entitled "Amorphous Phosphate Coatings for Thermal Protection of Aluminum Alloys and for Plant Adhesion," by Alfred Douty and F. B. Sprouse, Jr.

Although the referred to patent proved quite adequate for the purposes intended, that is, an increase in the coating surface density serves to directly decrease the $a_s/e$ ratio of the aluminum surface, the coating weights employed could be a disadvantage where coating weight becomes a critical factor and where $a_s/e$ ratios less than 0.82 are desired. It was for this reason that the present invention was developed.

Accordingly, it is an object of the present invention to provide the use of a coating for the control of the $a_s/e$ value of an aluminum surface wherein minimum coating weights provide maximum thermal control.

Another object of the present invention is the provision of a method of converting an amorphous phosphate coating on an aluminum surface into a more stable bonded phosphate coating bonded directly to the aluminum substrate.

A further object of the present invention is the provision of a method of reducing the weight requirements of large inflatable satellite structures while maintaining the thermal protective characteristics thereof.

Another object of the present invention is the provision of a modified chemically adherent amorphous phosphate coating for an aluminum surface space vehicle.

Yet another object of the present invention is the method of controlling the temperature parameter of an aluminum surface area while employing a minimum surface density coating for the aluminum surface.

An additional object of the present invention is a method of regulating the $a_s/e$ ratio of an aluminum surface.

The foregoing and other objects are attainable in the present invention by providing a thermal control amorphous phosphate coating on an aluminum surface and treating the resulting coating with a basic solution to improve the chemical bond thereof with the substrate, while simultaneously reducing the coating weight.

Figure 2:
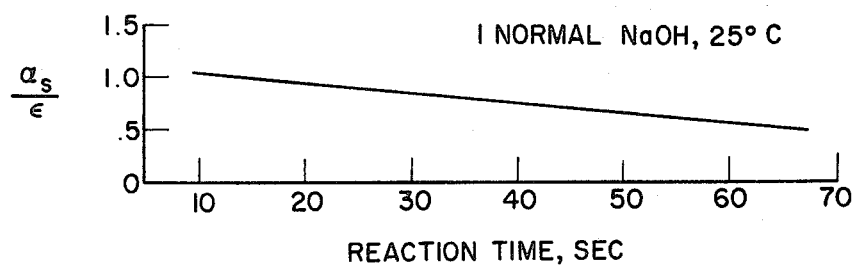
Figure 3:
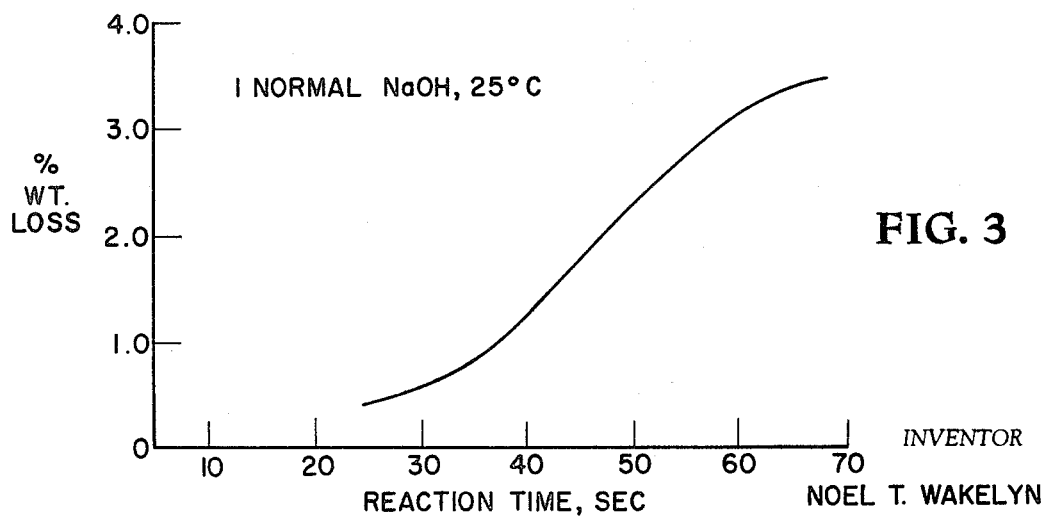

A more complete appreciation of the invention and many of the attendant advantages thereof will be readily apparent as the same becomes better understood by reference to the following detailed description when considered in connection with the accompanying drawings wherein:

FIG. 1 is a graphic representation of the absorptance and emittance values obtained for an amorphous phosphate coated aluminum surface in relation to immersion time in a 1 Normal sodium hydroxide solution at 25° C.;

FIG. 2 is graphic representation of the change in $a_s/e$ ratio for a typical amorphous phosphate coated aluminum surface in relation to immersion time in a 1 Normal sodium hydroxide solution at 25° C.; and FIG. 3 is a graphic representation of the percent coating weight loss for a typical amorphous phosphate coated aluminum surface in relation to immersion time in a 1 Normal sodium hydroxide solution at 25° C.

According to the present invention the initial coating process is employed as in the Clemmons patent, with the aluminum-plastic laminate being formed of the desired length and width dimensions and stored on conventional spools. The laminate is then available for a continuous mass-production type coating process wherein it can be passed through a cleaning solution to remove grease and other surface contaminants, rinsed to remove the cleaning solution and passed through a vat of coating solution prior to being washed, dried and taken up by a suitable take-up roller.

A suitable acid bath, such for example Alodine 401–41 or like similar acid solution which will react with a thickness of the aluminum surface and thereby provide the desired chemically adherent metallic phosphate coating thereon may be employed for the acid bath coating solution. Generally speaking, the weight of the amorphous phosphate coating obtained will vary, within limits, directly with the immersion time at a given bath temperature and solution concentration. For purposes of illustration, a bath temperature of 110° F.±0.5° F. and Alodine 401–41 are employed in this application. As disclosed in the referred to Clemmons patent, the $a_s/e$ ratio for Alodine 401–41 essentially decreases directly with coating weight increase from a value of approximately 7.0 at 30.4 milligrams per squre foot to a minimum value of 0.82 for coating densities of 426 milligrams, and above, per square foot. It is readily seen that this teaching enables adequate adjustment of the $a_s/e$ ratio desired within these values, with approximately 200 mg./ft.$^2$ coating providing an $a_s/e$ of 1.67.

This accurate $a_s/e$ adjustment is possible because the solar absorptance ($a_s$) increases initially and then remains virtually constant over a wide range of increasing surface densities or thicknesses. In contrast, the thermal emittance was found to increase almost linearly over the same increasing range of surface densities. This variation of thermal emittance with surface density is the controlling factor permitting the wide range of equilibrium temperatures for Alodine-coated structures by merely selecting the appropriate surface density for the desired $a_s/e$ ratio. Since the thermal emittance of this type of surface is the controlling factor in its useful optical properties, an investigation of Alodine coatings in the infrared spectrum was initiated.

A typical infrared absorptance spectrum for an Alodine coating of this type, when compared with a plot of the spectral-energy distribution of a 300° K. blackbody discloses two prominent peaks. The first peak in the spectrum is relatively narrow and occurs approximately in the 3.8 micron region. This peak is of little significance and has been attributed to the acidic hydroxyl group, as discussed by E. Z. Arledge et al., "Infrared, X-ray, and Thermal Analysis of Some Aluminum and Ferric Phosphates," Journal of Applied Chemistry, volume 13, pages 17–26 (1963). The second and much broader peak in the spectrum occurs in the 7.5 to 11 micron region and is related to the phosphate group (also discussed in the Arledge article and by Miller and Wilkens in volume 24, page 1253, Analytical Chemistry, "Infrared Spectra and Characteristic Frequencies of Inorganic Ions"). These particular differences in the spectrum are attributed to the fact that more than twenty-five percent of the total energy of a 300° K. blackbody falls within the 8 to 12 micron region, while less than one percent thereof is found at wavelengths shorter than 4 microns. It was thus hypothecated that if the chemical nature of the phosphate group could be sufficiently changed to alter the intensity of the broad peak at the 7.5 to 11 micron level, then the thermal emittance of the Alodine-coated surface could be increased within limits, without resorting to increased surface densities.

Thus, by the present invention, the coating densities may be appreciably reduced by further chemical conversion of the amorphous phosphate or Alodine coating while maintaining the same or smaller $a_s/e$ ratio values. This further chemical conversion is accomplished by varying the acidic nature of the phosphate groups occurring in the coated surface as illustrated by:

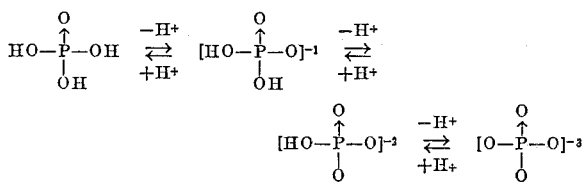

By causing the above series of equilibra to shift toward the right, the vibration of the P–O bond is changed. The subsequent decrease in the hydroxyl content reduces the possibility of hydrogen bonding involving the OH group and thus permits increased P–O vibrations. These increased P–O vibrations result in an increase in the intensity at the 7.5 to 11 micron region and hence lead to a coating surface with a higher emittance, and resulting in decreased $a_s/e$ ratio. The metallic phosphate coatings as disclosed in the referenced Clemmons patent, were obtained at a pH level of approximately one. As is known in the art, under a pH condition in this area, that is, highly acid concentrations, only one metal-oxygen-phosphorous bond (M–O–P) would be formed. Experimental results showed that the emissivity properties of the adherent amorphous phosphate coatings were dependent upon this bond arrangement. Thus, if additional M–O–P bonds could be obtained from the phosphoric acid a radial structure

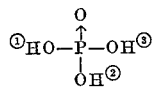

then a corresponding change in the emissivity would be found and the resulting reduced $a_s/e$ ratio could also be obtained under controlled conditions. Treatment of the amorphous phosphate coating obtained in the copending application, with a 1-Normal sodium hydroxide solution, proved that additional M–O–P bond arrangements could be so obtained. More specifically, since it is known that hydrogen ① reacts at a pH of about one, this would be the bond anticipated for the coating employed under the high acidic conditions employed in the copending application. Similarly, since hydrogen ② is known to react at a pH of about seven, and hydrogen ③ at a pH of about eleven, efforts were undertaken to treat the coating formed under the highly acidic conditions with suitable basic solutions under varying times, concentrations, and temperatures, to achieve an improved adherent coating having the desired density and $a_s/e$ characteristics.

Individual samples of the amorphous phosphate coated laminate described hereinbefore, and in the referred to copending application, having an $a_s/e$ ratio of approximately 1.00 were reacted with dilute sodium and potassium hydroxide solutions at 1° C. and at 25° C. for times ranging from 10 to 60 seconds. The samples were then rinsed in water, dried in air and the infrared-absorption spectra again determined.

Experiment I

Utilizing Alodine-coated samples selected at random from a laminate panel, prepared as described hereinbefore and known to have an $a_s/e$ ratio slightly greater than one, the following results were obtained when employing a 1-Normal sodium hydroxide solution immersion bath at 25° C. The samples were weighed, immersed for the indicated time, rinsed with distilled water after immersion, air dried, reweighed and then checked for the resulting $a_s/e$ ratios.

The results of these tests are set forth in the following table:

Experiments II and III

Samples from the same laminate panel as in Experiment I were also tested in a 1-Normal sodium hydroxide immersion bath at 1° C. and 50° C. to determine the bath temperature effects on the $a_s/e$ ratios. These results showed only a slight change in the $a_s/e$ ratio value during 10–60 seconds immersion at 1° C., while the bath at 50° C. became too active to permit adequate testing to thus further indicate that bath temperature is an important factor in the present invention.

Experiments IV and V

Test samples, and test conditions identical to Experiments I and II were conducted in a 1.5 N NaOH immersion bath at both the 25° C. and 0° C. temperatures and 0.5 NaOH baths at 25° °C. and 50 C. These tests indicated that a 1.5 N NaOH solution at 25 °C. tended to destroy the metallic phosphate coating and the $a_s/e$ measurements obtained in these tests proved unreliable. At 0° C., the 1.5 N NaOH caused very little change in the $a_s/e$ ratio for the samples, to further indicate the importance of immersion bath temperature. Similarly, the 0.5 N NaOH solution proved unreliable at 25° C. while tending to destroy the Alodine coating at the higher temperature and increased immersion time.

Experiments VI and VII

Test samples and test conditions identical to Experiment I were conducted in a 1-Normal potassium hydroxide solution at temperatures of 25° C. and 1° C. for immersion times of 10–60 seconds. These tests produced similar results as those obtained for the same concentrations and temperatures of 1 N NaOH to indicate that KOH solutions at 25° C. were also practical in practicing the present invention.

Additional ultraviolet and vacuum tests have also shown that the aluminum-plastics laminates provided with the thermal protective coatings as described in the present invention, and as specifically set forth in Experiments I and VI, are optically stable to a simulated space environment to at least the same degree, and in most cases, more stable than the metallic phosphate coatings disclosed in the referred to copending application. It is thus seen that

TEST RESULTS

| Sample Number | Immersion Time (sec.) | Weight Before Mg. | Weight After Mg. | Δ Weight Mg. | Percent Δ | $e$ | $a_s$ | $a_s/e$ |
|---|---|---|---|---|---|---|---|---|
| 3–1 | 10 | 27.8 | 28.0 | +0.20 | +.72 | .228 | .244 | 1.07 |
| 3–91 | 10 | 27.3 | 27.3 | 0 | 0 | .231 | .245 | 1.061 |
| 3–2 | 20 | 28.1 | 28.1 | 0 | 0 | .232 | .222 | .957 |
| 3–92 | 20 | 27.0 | 26.9 | −0.1 | −.37 | .260 | .248 | .954 |
| 3–3 | 30 | 26.7 | 26.8 | +0.1 | +.37 | .286 | .225 | .787 |
| 3–93 | 30 | 26.3 | 26.1 | −0.2 | −.76 | .274 | .231 | .843 |
| 3–4 | 40 | 28.9 | 28.7 | −0.2 | −.69 | .296 | .227 | .767 |
| 3–94 | 40 | 27.2 | 26.8 | −0.4 | −1.47 | .319 | .236 | .740 |
| 3–5 | 50 | 27.5 | 27.3 | −0.2 | −.73 | .365 | .219 | .600 |
| 3–95 | 50 | 26.2 | 25.9 | −0.3 | −1.14 | .344 | .207 | .602 |
| 3–96 | 60 | 26.8 | 25.9 | −0.9 | −3.36 | .377 | .216 | .573 |
| 3–37 | 60 | 26.6 | 25.8 | −0.8 | −3.01 | .400 | .209 | .523 |

These results are graphically represented in FIGS. 1–3.

The bond at 7.5 to 11 microns for these treated samples was found to increase whereas the acidic OH bond at 3.8 microns was found to decrease with reaction time in the basic solutions. Similarly, the resultant increase in the thermal emittance was found to be linear with reaction time from an emissivity of 0.2 to 0.4.

In addition, it was found that the solar absorptance and surface weight both decreased essentially linearly with reaction time of the basic solutions. This novel approach to modifying the thermal surface control coatings thus now makes it possible to obtain a low $a_s/e$ ratios without the necessity of increasing the coating surface densities. Similarly, by providing the additional M—O—P bonding arrangement, it is believed that these novel treated coatings will better adhere to the aluminum surfaces and accordingly prove more stable in the space environment.

the present invention provides a new and novel method of achieving thermal balance for a spacecraft in which the thermal control coating surface can be minimized.

There are, obviously, many modifications and variations of the present invention possible in the light of the above teachings. It is therefore to be understood that within the scope of the appended claims, the invention may be practiced otherwise than as specifically described.

What is claimed as new and desired to be secured by Letters Patent of the United States is:

1. A method of improving the optical and thermal control property characteristics of an aluminum surface having an amorphous metal phosphate protective coating thereon and formed by immersing the aluminum in a strong solution of chromic, phosphoric and hydrofluoric acids, comprising the steps of:

immersing said surface coating in a 1 N alkaline solution selected from the group consisting of NaOH and KOH and maintained at approximately 25° C. for a period in the range of 20–60 seconds, said alkaline solution serving to decrease the normally occurring hydroxyl content of said coating to thereby reduce the hydrogen bonding involving OH groups and permit increased P—O vibration within the chemical structure of said metal phosphate coating, said increased P—O vibration serving to provide an increase in the number of metal-oxygen-phosphorous bonds for the phosphoric acid radicals in said coating, said increase in metal-oxygen-phosphorous bonds providing an increase in the aluminum surface coating emittance property characteristic to thereby decrease the $a_s/e$ ratio value for said coating and improve the coating stability when exposed to an ambient spatial environment, and said metal phosphate coating density being decreased in relationship to the length of time said aluminum surface is subjected to said alkaline solution.

2. A method of providing a minimum density, optical and thermally stable coating for an aluminum-plastics-aluminum laminate surface adapted for use as a passive communication satellite in a spatial vacuum, said aluminum surfaces having a portion of the thickness thereof consisting of a layer of amorphous metallic phosphate formed thereon by immersing said surfaces in a temperature controlled aqueous solution of chromic, phosphoric and hydrofluoric acids of the desired portions for a sufficient period of time to provide a metallic phosphate surface coating on the aluminum surface, said metallic phosphate coating having a density selected from the range of 30.4 to 426 milligrams per square foot of aluminum surface area, and said coating surface density serving to determine the $a_s/e$ ratio value for said coating surface, the improvement comprising:

immersing said metallic phosphate coated aluminum surface in a 25° C. bath of a 1 N alkaline solution selected from the group consisting of NaOH and KOH for a controlled period of time in the range of 10 to 60 seconds, said alkaline solution having the inherent chemical property characteristic of affecting the chemical bond structure of said metallic phosphate coating to improve the chemical adherence of said coating to said aluminum surface while simultaneously reducing the coating density and $a_s/e$ ratio thereof.

3. A method of providing a low density thermal protective coating on an aluminum surface comprising:

forming a metallic phosphate coating on said aluminum surface by immersing said surface under controlled conditions in a strong solution of chromic, phosphoric and hydrofluoric acids, rinsing said coated surface in water to remove excess acid, immersing said coating surface in a solution selected from the group consisting of 1 N NaOH and 1 N KOH at 25° C. for a period of time in the range of 10–60 seconds, rinsing said surface in water to remove excess hydroxide solution, and drying said surface, said hydroxide serving to reduce the $a_s/e$ ratio value of said aluminum coated surface substantially linear with surface immersion time within said range while simultaneously reducing the density and improving the adherence of the metallic phosphate coating formed on said aluminum surface by said acid immersion.

4. A method of altering the $a_s/e$ ratio of an aluminum surface having a metallic phosphate thermal protective coating thereon formed by immersing the aluminum surface in a temperature controlled aqueous solution of chromic, phosphoric and hydrofluoric acids and of known density comprising:

chemically converting said metallic phosphate coating into a more stable chemical bond with said aluminum surface by immersing said surface in a 1 N alkaline solution selected from NaOH and KOH for a period of time in the range of 10–60 seconds and at a temperature of about 25° C., rinsing said surface with distilled water, and drying said surface.

References Cited

UNITED STATES PATENTS

| | | | |
|---|---|---|---|
| 2,120,212 | 6/1938 | Curtir | 148—6.15 |
| 2,634,224 | 4/1953 | Faucher | 148—6.16 |
| 3,154,438 | 10/1964 | Keller et al. | 148—6.16 X |
| 3,176,933 | 4/1965 | Clemmons | 148—6.16 X |

FOREIGN PATENTS 643,037    5/1964    Belgium.

RALPH S. KENDALL, *Primary Examiner.*